United States Patent Office 3,051,754
Patented Aug. 28, 1962

3,051,754
PREPARATION OF AMINE-BORINES
Herbert Jenkner, Hannover-Wulfel, Germany, assignor to Kali-Chemie A.G., Hannover, Germany
No Drawing. Filed Mar. 10, 1958, Ser. No. 719,996
Claims priority, application Germany Mar. 9, 1957
4 Claims. (Cl. 260—583)

The invention relates to the preparation of amine borines, which compounds are also designated borazans, borazenes, and borazines.

I have discovered a simple method for the preparation of such compounds which does not require the use of diborane and may be carried out at atmospheric pressure.

My novel method consists in reacting alkali metal hydrides and amines with boron halides in the presence of a compound activating the alkali metal hydride; preferably, the reaction is carried out in inert solvents or liquids serving as suspending medium.

The reaction is illustrated by the equation $$BCl_3 + N(CH_3)_3 + 3NaH \xrightarrow{activator} BH_3N(CH_3)_3 + 3NaCl$$

and is carried out at elevated temperatures, preferably in the range of about 40 to 120° C. and atmospheric pressure. Sometimes, slightly elevated pressures up to about 12 atm. may be of advantage.

Suitable boron halides are particularly the boron chlorides, whereby not only the boron trichloride but also organosubstituted, for instance monoalkyl and mono alkoxy boron dichloride and the dialkyl and dialkoxy boron monochloride may be used; also addition compounds of the boron chlorides with organic nitrogen and oxygen compounds may be reacted.

The preferred alkali metal hydride is sodium hydride, because it is the cheapest and most readily available alkali metal hydride and reacts very quickly. Also potassium hydride reacts readily but is more expensive and less readily available than the sodium hydride. Lithium hydride reacts more slowly, particularly when only small amounts of activator are present. Also mixtures of different alkali metal hydrides may be used.

Preferably, the alkali metal hydride is used in finely divided form. The larger the batch, the coarser may be the sodium hydride.

As activator for the alkali metal hydride, I use an organo-boron compound, particularly compounds of the formula $$BR_xR'_{3-x}$$

wherein R and R' may designate the same or different atoms or groups. R and/or R' may be alkyl, such as methyl, ethyl, propyl, butyl, hexyl, or higher alkyls, or the corresponding alkoxy groups; or phenyl. R' may also be hydrogen, provided that at least one organic R' group is present. Suitable activators corresponding to the formula are, for instance, triethyl borine, tributyl borine, methyl borate, or the methyl esters of ethane boronic and diethane boronic acid.

It is not necessary to add the activator as such; compounds may be added which form with the boron halide the activator in the reaction mixture. Such compounds are organic compounds of lithium, sodium, potassium, magnesium, calcium, zinc, aluminum, gallium, and others, such as sodium alcoholates, sodium alkyls, zinc alkyls, and particularly aluminum alkyls, alkyl aluminum halides, alkyl aluminum hydrides, and aluminum alkoxides. Also complex compounds of boron itself, such as $NaHBR_3$ or $NaHB(OR)_3$ may be used.

The activator is already effective in amounts of only 5 percent by moles, and less, calculated on the alkali metal hydride. I prefer to use amounts in the range of 5 and 30, for instance 10 to 20 percent by moles. Considerably higher amounts may be used, of course, and do not do any harm.

Generally, it may be said that higher reaction temperatures require smaller amounts of activator. Similarly, the amount may be reduced when the boron halide is slowly added. Stirring generally increases the rate of reaction.

As amine, I use preferably secondary or tertiary amines of the formula $NR_xR'_{3-x}$ wherein R is a member of the group consisting of alkyl having 1 to 5 carbon atoms and hydrogen, R' is alkyl having 1 to 5 carbon atoms, and x is an integer from 1 to 2, or a heterocyclic nitrogen base, such as piperidine, morpholine, and their N-alkyl derivatives; suitable amines are, for instance, trialkylamines, such as trimethylamine, triethylamine, tripropylamine, diethylpropylamine, di- or tri-butylamine, alkyl piperidine, morpholine, alkyl morpholine.

Neither the nature nor the amount of the amines is critical as they act essentially as complexing agent for the otherwise instable borine produced by the reaction of the alkali metal hydride with the boron halide. More or less than the stoichiometric amount may be added, for instance in portions. Generally I found it of advantage to apply about 5 to 20 percent of excess amine over the stoichiometric amount.

The reaction is preferably carried out in a liquid medium, which may serve as a solvent for the boron halide, activator, and amine, and as a suspending medium for the alkali metal hydride, and which does not react with the reactants and reaction products. Suitable liquids are hydrocarbons, such as hexane, heptance, octane, benzene, toluene, xylene, cyclohexane, methylcyclohexane, methylnaphthalene, triethylsilane, tetra-alkylsilanes, mineral oils, also the produced borazans or borazenes themselves, and many more.

The produced amine borine may be distilled or dissolved from the reaction residue, or the obtained alkali metal halide may be removed from the reaction product and liquid medium by filtration or centrifuging. Under these circumstances, it will be readily understood that no fast rule can be given for the solvent or suspending medium to be used. Frequently, it will be a question of cost because part of the solvent or suspending medium will be lost in the processing operation. If the obtained amine-borine compound is distilled off, it will be of advantage to use a liquid medium which has a boiling point sufficiently different from the boiling point of the reaction products to insure quantitative recovery of the reaction product and fast separation. High boiling mineral oils are particularly suitable for this purpose.

The following examples, in which parts are given by weight unless otherwise specified, are given only to illustrate the invention and are not intended to limit the invention. Example 8 is intended to show particularly the results obtained when no activator is used.

Example 1

A suspension of 50 parts of sodium hydride in 200 parts of a mineral oil ($B_{.1}$:200–220° C.) was heated at 70° C., and 15 parts of triethyl borine were added. Subsequently, 68 parts of triethylamine were added, and to the stirred mixture 79 parts of boron trichloride were slowly added. During this time, the reaction mixture was maintained at a temperature between 70 and 80° C. Distillation of the reaction product yielded 71 parts of N-triethyl borazan, $BH_3 \cdot N(C_2H_5)_3$, $B_{.10}$ 96–98° C. The yield was in excess of 92%.

Example 2

20 parts of methyl borate were added to a suspension of 43.5 parts of sodium hydride in 200 parts of a mineral oil as used in Example 1. The mixture was heated at a temperature of 90 to 110° C. Then, 52 parts of triethylamine were added, and subsequently 52 parts of boron trichloride were passed into the mixture within 3½ hours.

Vacuum distillation yielded 43.2 parts of N-triethyl borazan corresponding to 83% of theory.

*Example 3*

To a suspension of 48.4 parts of NaH in 450 parts of a mineral oil as used in the preceding examples, there were added, at a temperature of 100 to 125° C., first 45 parts of methyl borate and then 45 parts of triethylamine.

The mixture was maintained at 110° C. and vigorously stirred while 60 parts of boron trichloride were slowly introduced. Then further 25 parts of triethylamine were added, and 26 more parts of boron trichloride introduced.

By a vacuum distillation, methyl borate and some triethylamine were first distilled off, whereupon 61 parts of N-triethyl borazan were obtained. In addition, there was produced a small amount of $N(C_2H_5)_3BH_2OCH_3$.

*Example 4*

50 parts of sodium hydride methyl borate and 36 parts of triethylamine were added to 44 parts of sodium hydride suspended in 400 parts of mineral oil as used in Example 1.

The mixture was heated at a temperature of 90–105° C. and 121.5 parts of methoxy boron dichloride, $CH_3OBCl_2$, were added, whereby after addition of about half said amount further 34 parts of trimethylamine were added.

Vacuum distillation yielded 63 parts of a liquid which distilled at a pressure of 1.5 mm. Hg between 60 and 75° C. and consisted essentially of N-triethylborazan.

*Example 5*

26 parts of methyl borate were combined with a suspension of 24 parts of sodium hydride in 220 parts of mineral oil, as set forth in Example 3. Then, 62 parts of tributylamine were added, and 39 parts of boron trichloride were introduced at 100–110° C.

The tributylamine-borine (N-tributylborazan) was distilled off from the oil-NaCl mixture. Yield: 50 parts. First run: Boric acid ester, $N(C_2H_5)_3BH_2OCH_3$-mixture.

*Example 6*

The experiment of Example 5 was repeated under substantially the same conditions but using, instead of tributylamine, 48 parts of tripropylamine.

Distillation yielded 41.5 parts of a colorless liquid, which consisted essentially of N-tripropyl borazan ($B_2$ 85–86° C.).

*Example 7*

In a manner as set forth in Example, 6, 48 parts of sodium hydride suspended in 420 parts of mineral oil were reacted with 45 parts of methyl borate. Then, instead of tripropylamine, 68 parts of N-methylmorpholine were added, and 82 parts of boron trichloride were slowly passed into the mixture at 100 to 112° C., whereby 80 additional parts of mineral oil were added.

After removal of the first run (mainly boric acid ester), 63.5 parts of N-methylmorpholine-borine were obtained (85% of the theoretical amount).

*Example 8*

This experiment was carried out similarly to Example 1, but without the use of the activator triethyl borine.

33.8 parts of triethylamine were added to a suspension of 2 moles of NaH in 220 parts of mineral oil, and then 39 parts of boron trichloride were introduced at a temperature of 110° C. On addition of the $BCl_3$, the initially greyish reaction mixture became immediately red brown. On distillation, a yellow substance condensed in the cooler, which substance consisted essentially of $BCl_3 \cdot N(C_2H_5)_3$. There was no $BH_3 \cdot N(C_2H_5)_3$ obtained.

*Example 9*

27.4 parts of sodium hydride were suspended in 120 parts of mineral oil, and the mixture was heated to 72° C. To this mixture were added 115 parts of borontriethyl and 43.2 parts of triethylamine, and then 45 parts of boron trichloride were introduced.

By distilaltion in vacuo (oil bath temperature up to 185° C.) the readily volatile components were distilled off. On further distillation, 40.5 parts of a colorless liquid distilled at B.P. 95–97° C. at 10 mm. Hg, which consisted substantially of N-triethyl borazan (92% of the theoretical amount).

*Example 10*

20 parts of methyl borate were added at 120° C. to a suspension of 8 parts of lithium hydride in 200 parts of mineral oil. Then 35 parts of triethylamine were added to the mixture, and 42 parts of $BCl_3$ were added with vigorous stirring. Vacuum distillation yielded only 10 parts of N-trithylborazan.

The experiment shows that lithium hydride is less suitable for the preparation of borazans than sodium hyride.

*Example 11*

49 parts of NaH, suspended in 450 parts of toluene, were activated at 100–120° C. with 45 parts of methyl borate. Subsequently, a solution consisting of 51 parts of $BH_3N(C_2H_5)_3$ and 154 parts of $BCl_3N(C_2H_5)_3$ was added at 90–110° C.

By vacuum distillation, a total amount of 85 parts of $BH_3 \cdot N(C_2H_5)_3$ was obtained.

*Example 12*

24 parts of sodium hydride, suspended in 220 parts of mineral oil, were reacted with stirring at a temperature of 70° C. with 22 parts of boric acid methyl ester and 43 parts of dibutylamine and at a temperature of 110° C. with all together 39.1 parts of boron trichloride.

By vacuum distillation, 37.3 parts of a colorless liquid, which consisted of a mixture of N-dibutyl borazane and of N-dibutyl borazene, could be distilled off the reaction mixture, which corresponds to a yield of more than 78% of the theory.

*Example 13*

26.7 parts of potassium hydride, suspended in 300 parts of mineral oil, were mixed at 80° C. with 18 parts of boric acid trimethylester and with 22.4 parts of triethylamine. Afterwards 28 parts of boron trichloride were introduced at the same temperature.

By vacuum distillation at $B_{.1.5}$=75 to 80° C., 12.3 parts of triethylamine borine were obtained.

*Example 14*

9.9 parts of sodium hydride, suspended in 150 parts of mineral oil, were mixed with 4 parts of boron triethyl and 41.1 parts of triethylamine. The temperature amounted to 80° C.

Thereupon 43 parts of diethyl boron chloride were added successively at the same temperature. After removing the obtained boron triethyl and the surplus triethylamine, 11.5 parts of an almost pure N-triethyl borazane were obtained by vacuum distillation.

I claim:

1. The method of preparing amine-borines which consists in heating a boron chloride compound of the formula $$BCl_nR_{3-n}$$

wherein *n* is an integer from 1 to 3, and R is a member of the group consisting of lower alkyl and lower alkoxy, at a temperature of about 40 to 120° C. with sodium hydride and an amine selected from the group consisting of piperidine, morpholine, lower N-alkyl derivatives of piperidine and morpholine, and secondary and tertiary lower alkylamines, the alkyl group of said alkylamines having 1 to 5 carbon atoms, in the presence of an efficient amount of at least 5 percent by moles, calculated on said sodium hydride of an activator of the formula $$BR'_nR''_{3-n}$$

wherein R' is a member of the group consisting of lower alkyl, phenyl, and lower alkoxy, R" is a member of the group consisting of R' and hydrogen, and $n$ is an integer between 1 and 3.

2. The method as defined in claim 1, wherein said boron chloride compound is boron trichloride.

3. The method as defined in claim 1, wherein said activator is present in an amount of 5 to 30 percent by mole of said alkali metal hydride.

4. A method of preparing N-triethyl borazan comprising heating boron trichloride at a temperature of about 40 to 120° C. with sodium hydride and triethylamine in a mineral oil suspension containing triethylborine in an amount of about 5 to 30 percent by moles of said sodium hydride, and distilling off the obtained N-triethyl borazan.

References Cited in the file of this patent

UNITED STATES PATENTS 2,945,887     Jenker _____ July 19, 1960

OTHER REFERENCES

Smith et al.: J. Am. Chem. Soc., vol. 73, pp. 2751–2754 (1951).

Banus et al.: J. Amer. Chem. Soc., vol. 74, pp. 2346–2348 (1952).

Gaylord: Reduction with Complex Metal Hydrides, Interscience Publishers, Inc., New York, p. 21 (1956).